United States Patent Office 3,840,674
Patented Oct. 8, 1974

3,840,674
FLAVOURING AGENT AND PROCESS FOR PREPARING SAME
Arthur Joseph Mosher, Marysville, Ohio, assignor to Societe d'Assistance Technique pour Produits Nestle S.A., Lausanne, Switzerland
No Drawing. Filed Apr. 5, 1972, Ser. No. 241,431
Int. Cl. A23l 1/26
U.S. Cl. 426—65                                9 Claims

ABSTRACT OF THE DISCLOSURE

A flavouring agent comprising the reaction product of S-acetyl-mercaptosuccinic acid or its anhydride with a vegetable protein hydrolysate and/or autolysed yeast.

---

This invention is concerned with the preparation of products having a meat-like flavour.

Various processes are known for the preparation of meat-like flavours generally involving a Maillard reaction in which at least one amino acid is reacted with a monosaccharide. Sulphur-containing amino acids have been considered as conferring a desirable note to the products, and thus a typical reaction mixture may comprise cysteine or methionine, xylose and one or more additional amino acids which are conveniently provided in the form of a protein hydrolysate.

It has now been found that flavouring agents having the taste and aroma of roasted meat may be prepared by reacting S-acetyl-mercaptosuccinic acid or its anhydride with a vegetable protein hydrolysate or yeast autolysate. It has thus surprisingly been observed that very satisfactory flavouring products may be obtained from readily-available starting materials without including a specific saccharide or a sulphur-containing amino acid as reactant.

The relative amounts of the reactants may vary within wide limits, depending on the flavour notes desired in the finished product. In particular, it has been found that satisfactory flavouring materials are obtained when the amount of vegetable protein hydrolysate present in the reaction mixture corresponds to between about 10 and about 200 times the weight of S-acetyl-mercaptosuccinic anhydride. When S-acetyl-mercaptosuccinic acid is used, the amount of protein hydrolysate may be adjusted to take into account the higher molecular weight of the acid, but in most cases this is unnecessary. For convenience, S-acetyl-mercaptosuccinic acid and anhydride will be collectively referred to herein as "S-AMS," and it will be understood that whenever quantities are indicated these will be based on the anhydride unless otherwise noted.

Useful flavouring agents may also be prepared by reacting S-AMS with autolysed yeast. Such reaction products may also be combined with vegetable protein hydrolysate, for example by dry blending. The proportions of S-AMS and autolysed yeast in the reaction mixture will generally be within the range indicated for hydrolysed vegetable protein and S-AMS.

Whilst the reaction products prepared in accordance with the present invention are most aptly characterised as possessing a "roasted meat" flavour, by using hydrolysates of different vegetable proteins, or mixtures of such hydrolysates, products having specific beef or chicken flavour may also be prepared. For example, hydrolysates of corn gluten provide an essentially chicken flavour, whereas a beef-like flavour may be obtained by incorporating wheat germ hydrolysate. Hydrolysates of other vegetable proteins, such as soy meal, peanut cake and the like may also be used.

The reaction is conveniently effected in an aqueous medium, preferably at the reflux temperatures (close to 100° C.) of the reaction mixture. The relative proportions of water and reactants may for example vary between about 0.4 and about 3 parts by weight of water to 1 part by weight of reactants. A weight ratio of about 1:1 is particularly preferred, whereby the reaction mixture contains around 50% by weight of solids. Reaction times are not critical, but on the one hand should be sufficient for the reaction to be substantially complete and on the other hand extended heating times, which could lead to flavour degradation, should be avoided. In practice, therefore, reaction times may vary between about 30 minutes and 4 hours, and about 1 to 1½ hours are generally sufficient. Upon completion of the reaction, the reaction mixture may be concentrated and dried.

If desired, the flavour characteristics of reaction products of S-AMS and vegetable protein hydrolysate may be modified by incorporating yeast autolysate, either in the reaction mixture or in the product after reaction. Yeast autolysate confers smoothness and mouthfeel to the final flavour, and it may be added in an amount corresponding to up to about 40% by weight of the dry matter in the reaction mixture, or in the reacted material if the yeast autolysate is added after reaction. Apart from yeast autolysate, flavour enhancers such as nucleotides may also be added, generally at a level of about 0.5 to 2.0% by weight. Although the proportions of the principal ingredients of the flavouring agents may vary within broad limits, depending on the desired flavour profile, especially useful flavourings comprise the following:

|  | Percent by weight |
|---|---|
| S-AMS | 0.2–4 |
| Vegetable protein hydrolysate | 40–99 |
| Autolysed yeast | 0–56 |

It should be noted that a reaction product need be formed between only two of the ingredients, that is the S-AMS and either vegetable protein hydrolysate or autolysed yeast, and the third may be dry blended. Furthermore, compositions may also be provided in which only a part of the total hydrolysate and/or autolysate is reacted with S-AMS, and the balance required to bring the total amount of the ingredient or ingredients within the preferred limits given above is added to the reaction product.

Whilst the flavouring agents prepared by the process described herein are most conveniently presented as dry powders, obtained by drying the reaction product with which optional ingredients may be dry blended, paste-like products may also be provided by concentrating to eliminate only a part of the water present. The products have a wide range of application in various foodstuffs, conferring a pleasant note of roasted meat, chicken or beef. Particular food products to which the flavouring agents may be added include soups, bouillons, sauces, gravies and various frozen or canned prepared items.

The invention is illustrated by the following examples in which the parts and percentages are by weight. The term "nucleotides" refers to a 50/50 mixture of sodium inosinate and sodium guanylate.

EXAMPLE 1

A beef flavour is prepared by reacting the following ingredients for 1½ hours at reflux temperatures:

|  | Parts |
|---|---|
| Vegetable protein hydrolysate [1] | 49.5 |
| S-AMS (acid) | 0.5 |
| Water | 50.0 |

[1] Prepared from 70/30 mixture of corn gluten and wheat germ.

After the reaction the mixture is concentrated and dried under vacuum at 90° C. The flavouring agent thus prepared is a brown powder which disperses easily in water.

A product having the same flavour characteristics is also obtained by using S-AMS anhydride.

EXAMPLE 2

A chicken flavour is prepared by reacting the following ingredients for 1½ hours at reflux temperatures:

|  | Parts |
|---|---|
| Vegetable protein hydrolysate [1] | 48.25 |
| Autolysed yeast extract | 9.19 |
| S-AMS (anhydride) | 0.60 |
| Water | 41.36 |

[1] Prepared from corn gluten.

Upon completion of the reaction the mixture is concentrated by vacuum evaporation and dried. The dry product is soluble in water and has a pleasant flavour of roasted chicken. A particular meaty note may be obtained by adding to the dried material 0.6 parts of nucleotides.

EXAMPLE 3

Five beef flavours are prepared by refluxing the following ingredients (in parts) for 1 to 1½ hours, concentration and drying:

|  | A | B | C | D | E |
|---|---|---|---|---|---|
| Vegetable protein hydrolysate [1] | 35.18 | 45.90 | 37.82 | 41.15 | 39.37 |
| Autolysed yeast extract | 13.57 | 8.74 | 7.20 | 7.85 | 21.00 |
| S-AMS (anhydride) | 0.40 | [2] 1.09 | 0.47 | 0.50 | 0.26 |
| Nucleotides | 0.50 |  | 0.47 |  |  |
| Water | 50.25 | 44.27 | 54.04 | 50.50 | 39.37 |

[1] Prepared from 70/30 mixture of corn gluten and wheat germ (A, B, D and E); soy meal hydrolysate in Example C.
[2] Acid.

EXAMPLE 4

A beef flavouring is prepared by reacting S-AMS (6 parts) with yeast autolysate (94 parts) under reflux for 1½ hours in 100 parts of water. After drying, the reaction product may be combined with 400 parts of vegetable protein hydrolysate and 5 parts of nucleotides.

I claim:

1. A flavouring agent comprising the product by reacting one part by weight of S-acetyl-mercaptosuccinic acid or its anhydride with between 10 and 200 parts by weight of at least one substance selected from the group consisting of a vegetable protein hydrolysate and autolysed yeast, for a period of time sufficient to produce a meat-like flavour.

2. A flavouring agent comprising 0.2 to 4.0% by weight of S-acetyl-mercaptosuccinic acid or its anhydride, 40 to 99% by weight of vegetable protein hydrolysate and 0 to 56% by weight of autolysed yeast, said S-acetyl-mercaptosuccinic acid or anhydride having been reacted with at least a part of said vegetable protein hydrolysate or autolysed yeast for a period of time sufficient to produce a meat-like flavour.

3. A flavouring agent according to claim 2 in which the weight ratio of vegetable protein hydrolysate to S-acetyl-mercaptosuccinic acid or its anhydride is between 10 and 200 parts to 1.

4. A flavouring agent according to claim 2 in which the S-acetyl-mercaptosuccinic acid or anhydride has been reacted with at least a part of the autolysed yeast.

5. A process for preparing a flavouring agent which comprises reacting one part by weight of S-acetyl-mercaptosuccinic acid or its anhydride with between 10 and 200 parts by weight of at least one substance selected from the group consisting of vegetable protein hydrolysate and autolysed yeast, for a period of time sufficient to produce a meat-like flavour.

6. A process according to claim 5 in which the reaction is effected in an aqueous medium.

7. A process according to claim 6 in which the weight ratio of water to reactants is between 0.4 and 3 parts to 1.

8. A process according to claim 5 in which 10 to 200 parts by weight of a vegetable protein hydrolysate are reacted with 1 part by weight of S-acetyl-mercaptosuccinic acid or its anhydride.

9. A process according to claim 5 in which the reaction is effected at a temperature of about 100° C.

References Cited
UNITED STATES PATENTS

| 3,394,016 | 7/1968 | Bidmead et al. | 99—140 R |
| 3,519,437 | 7/1970 | Giacino | 99—140 R |

RAYMOND N. JONES, Primary Examiner

U.S. Cl. X.R.

426—221, 364

UNITED STATES PATENT OFFICE
CERTIFICATE OF CORRECTION

Patent No. 3,840,674　　　　Dated October 8, 1974

Inventor(s) Arthur Joseph Mosher

It is certified that error appears in the above-identified patent and that said Letters Patent are hereby corrected as shown below:

Column 3, line 41. "product by reacting" should be --product produced by reacting--

Signed and sealed this 22nd day of April 1975.

(SEAL)
Attest:

RUTH C. MASON
Attesting Officer

C. MARSHALL DANN
Commissioner of Patents
and Trademarks